US012804595B2

(12) United States Patent
Restuccia et al.

(10) Patent No.: US 12,804,595 B2
(45) Date of Patent: Nov. 17, 2026

(54) SIMULTANEOUS MULTI-SUBJECT ACTIVITY CLASSIFICATION THROUGH Wi-Fi SIGNALS

(71) Applicant: Northeastern University, Boston, MA (US)

(72) Inventors: Francesco Restuccia, Boston, MA (US); Khandaker Foysal Haque, Westbrook, ME (US); Milin Zhang, Portland, ME (US)

(73) Assignee: Northeastern University, Boston, MA (US)

( * ) Notice: Subject to any disclaimer, the term of this patent is extended or adjusted under 35 U.S.C. 154(b) by 299 days.

(21) Appl. No.: 18/489,570

(22) Filed: Oct. 18, 2023

(65) Prior Publication Data

US 2024/0188034 A1 Jun. 6, 2024

Related U.S. Application Data

(60) Provisional application No. 63/380,254, filed on Oct. 20, 2022.

(51) Int. Cl.
*H04W 64/00* (2009.01)
*H04B 7/06* (2006.01)

(52) U.S. Cl.
CPC ........ *H04W 64/006* (2013.01); *H04B 7/0626* (2013.01)

(58) Field of Classification Search
CPC . H04W 64/00; H04W 64/003; H04W 64/006; H04B 7/00; H04B 7/06; H04B 7/0619; H04B 7/0621; H04B 7/0626; H04B 7/0632
See application file for complete search history.

(56) References Cited

U.S. PATENT DOCUMENTS 11,894,902 B1 * 2/2024 Inti ........................ H04L 5/0062
12,279,190 B1 * 4/2025 Zhang ...................... H04W 4/38

FOREIGN PATENT DOCUMENTS

WO WO-2023249342 A1 * 12/2023 ............. G06N 3/084

OTHER PUBLICATIONS

Leveraging transfer learning in multiple human activity recognition using WiFi signal, by Sheheryar Arshad, published on Jun. 1, 2019 (Year: 2019).*

* cited by examiner

*Primary Examiner* — Siu M Lee
(74) *Attorney, Agent, or Firm* — Hamilton, Brook, Smith & Reynolds, P.C.

(57) ABSTRACT

Subjects and their activities are identified via a wireless network. A wireless transmitter device transmit a wireless signal through the environment, and a plurality of wireless receivers receive the wireless signal at a distinct location within the environment, and then generate a channel state information (CSI) packet indicating a state of a wireless communications channel associated with the wireless signal. A computing device processes the CSI packets from the plurality of wireless receivers to generate a CSI dataset as a function of the CSI packets. A subject classifier identifies a target subject of the plurality of subjects based on the CSI dataset via a subject machine learning (ML) model. An activity classifier identifies an activity exhibited by the target subject based on the CSI dataset via an activity ML model trained on a training dataset.

21 Claims, 9 Drawing Sheets

400

SIMULTANEOUS MULTI-SUBJECT ACTIVITY CLASSIFICATION THROUGH Wi-Fi SIGNALS

RELATED APPLICATION

This application claims the benefit of U.S. Provisional Application No. 63/380,254, filed on Oct. 20, 2022. The entire teachings of the above application are incorporated herein by reference.

GOVERNMENT SUPPORT

This invention was made with government support under Grant No. 2134973 awarded by the National Science Foundation. The government has certain rights in the invention.

BACKGROUND

Wi-Fi is one of the most pervasive wireless technologies worldwide; it has been estimated that by 2025, the Wi-Fi economy will reach a value of $4.9T. Beyond ubiquitous indoor connectivity, Wi-Fi also allows to develop highly pervasive device-free sensing applications. The latter are based on the intuition that the received Wi-Fi signals—in particular, the Channel State Information (CSI) computed to perform channel estimation and equalization—are affected by changes in the physical environment caused by any entity in between the source and the receiver. Among other applications, Wi-Fi sensing can be used for fine-grained indoor localization, activity recognition, and health monitoring.

SUMMARY

Example embodiments include a system for sensing an environment. A wireless transmitter device may be configured to transmit a wireless signal through the environment, and a plurality of wireless receivers may each be positioned at a distinct location within the environment. Each of the plurality of wireless receivers may be located closest to a respective subject of a plurality of subjects and configured to 1) receive the wireless signal at the distinct location within the environment via at least one respective antenna, and 2) generate a channel state information (CSI) packet indicating a state of a wireless communications channel associated with the wireless signal. A computing device may be configured to process the CSI packets from the plurality of wireless receivers to generate a CSI dataset as a function of the CSI packets. A subject classifier may be configured to identify a target subject of the plurality of subjects based on the CSI dataset via a subject machine learning (ML) model. An activity classifier may be configured to identify an activity exhibited by the target subject based on the CSI dataset via an activity ML model trained on a training dataset.

The computing device may be further configured to generate the CSI dataset as a function of a subset of the CSI packets generated at distinct points during a given time interval. The subject ML model may be one of a plurality of subject ML models each assigned to a respective one of the wireless receivers. The subject classifier may be further configured to update each of the plurality of subject ML models based on a subset of the CSI dataset associated with the respective one of the wireless receivers.

An embedding network may be configured to map an input tensor to a latent vector, the input tensor corresponding to a subset of the CSI dataset. The activity classifier may be configured to identify the activity by mapping the latent vector to a label via the activity ML model. The embedding network and activity classifier may be trained jointly via the training dataset. The training dataset may be a first training dataset, and wherein the activity classifier is further trained via a second training dataset distinct from the first training dataset.

The wireless transmitter may include a plurality of antennas through which the wireless signal is transmitted through the environment. The activity classifier may be trained via the training dataset and a few-shot learning (FSL) process. The activity classifier may be further configured to determine the activity based on at least one previous activity that was determined for a prior CSI dataset obtained at an earlier point in time. The at least one activity may include movement of the subject within the environment.

Further embodiments include a method of operating a classification engine. During a meta-learning phase, an embedding network and a classifier may be trained jointly. During an optimization phase, the classifier may be trained independent from the embedding network via a training dataset. During an operational phase, via the embedding network, an input tensor may be mapped to a latent vector, the input tensor corresponding to an input dataset. Further, via the classifier, a classification corresponding to the input tensor may be identified by mapping the latent vector to a label.

Further embodiments include a method of sensing an environment. A wireless signal may be transmitted through the environment. Via a plurality of wireless receivers, the wireless signal may be received at the distinct location within the environment via at least one respective antenna, each of the wireless receivers positioned at a distinct location within the environment, each of the plurality of wireless receivers being located closest to a respective subject of a plurality of subjects. Via the plurality of wireless receivers, a channel state information (CSI) packet indicating a state of a wireless communications channel associated with the wireless signal may be generated. The CSI packets from the plurality of wireless receivers may be processed to generate a CSI dataset as a function of the CSI packets. A target subject of the plurality of subjects may be identified based on the CSI dataset via a subject machine learning (ML) model trained on a first training dataset. An activity exhibited by the target subject may then be identified based on the CSI dataset via an activity ML model trained on a second training dataset.

The CSI dataset may be generated as a function of a subset of the CSI packets generated at distinct points during a given time interval. The subject ML model may be one of a plurality of subject ML models each assigned to a respective one of the wireless receivers. Each of the plurality of subject ML models may be updated based on a subset of the CSI dataset associated with the respective one of the wireless receivers. An input tensor may be mapped to a latent vector, the input tensor corresponding to a subset of the CSI dataset. The activity may be identified by mapping the latent vector to a label via the activity ML model. The embedding network and classifier may be trained jointly via the training dataset. The training dataset may be a first training dataset, and the activity classifier may be further trained via a second training dataset distinct from the first training dataset.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Recent advances in Wi-Fi sensing have ushered in a plethora of pervasive applications in home surveillance, remote healthcare, road safety, and home entertainment, among others. Existing solutions are limited to the activity classification of a single human subject at a given time. Even though achieving acceptable sensing performance, a significantly more relevant and realistic problem is performing simultaneous, multi-subject Wi-Fi sensing. Moreover, it is well known that Wi-Fi sensing is highly dependent of the considered subject and environment. Although some attempts to address the issue have been made, they consider few activities (e.g., fewer than 5) or do not consider multi-subject classification.

Conversely, a more realistic scenario is to achieve simultaneous, multi-subject activity classification. The first key challenge in that context is that the number of classes grows exponentially with the number of subjects and activities. Moreover, Wi-Fi sensing systems struggle to adapt to new environments and subjects. To address both issues, example embodiments provide a first framework for simultaneous multi-subject activity classification based on Wi-Fi that generalizes to multiple environments and subjects. Example embodiments address the scalability issue by using the Channel State Information (CSI) computed from the device positioned closest to the subject. Example embodiments experimentally prove this intuition by confirming that the best accuracy is experienced when the CSI computed by the transceiver positioned closest to the subject is used for classification. To address the generalization issue, example embodiments may use a few-shot learning algorithm named Feature Reusable Embedding Learning (FREL). Through an extensive data collection campaign in 3 different environments and 3 subjects performing 20 different activities simultaneously, example embodiments achieve classification accuracy of up to 97%, while FREL improves the accuracy by 85% in comparison to a traditional Convolutional Neural Network (CNN) and up to 20% when compared to the state-of-the-art few-shot embedding learning (FSEL), by using only 15 seconds of additional data for each class.

Figure 1:
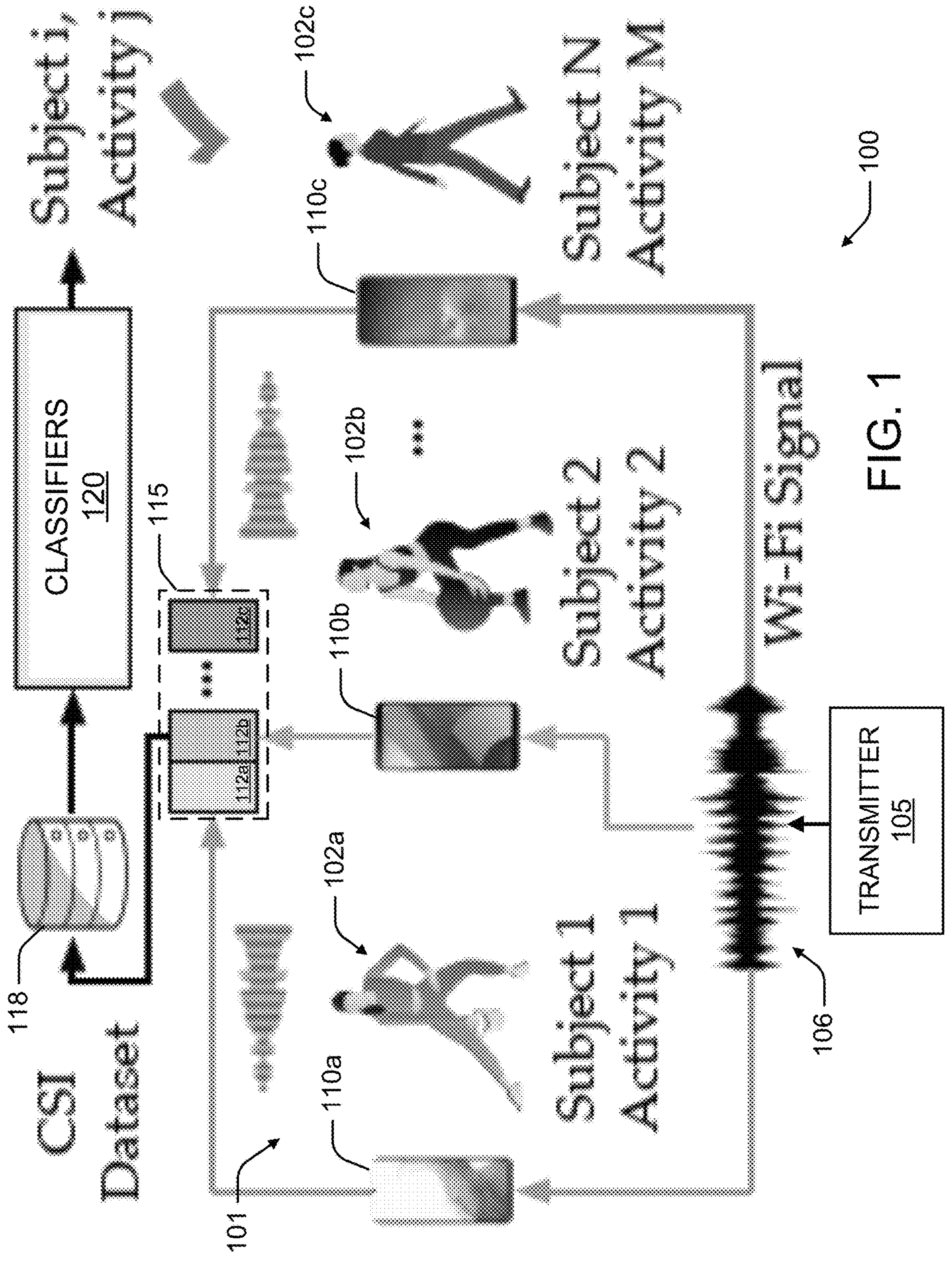
FIG. 1 is a diagram of a system for sensing an environment in one embodiment.

FIG. 1 is a diagram of a system 100 for sensing an environment in one embodiment. A wireless transmitter device may be configured to transmit a wireless signal 106 through the environment 101, and a plurality of wireless receivers 110*a-c* may each be positioned at a distinct location within the environment 101. Each of the wireless receivers 110*a-c* may be located closest to a respective subject 102*a-c*, and may receive the wireless signal 106 at the distinct location via at least one respective antenna (not shown). The wireless receivers 110*a-c* may each generate a channel state information (CSI) packet 112*a-c* indicating a state of a wireless communications channel associated with the wireless signal. A computing device 115 may receive wirelessly the CSI packets 112*a-c* from the plurality of wireless receivers 110*a-c* and process the CSI packets 112*a-c* to generate a CSI dataset as a function of the CSI packets 112*a-c*. The computing device 115 may then forward the packets for further processing (e.g., to a server and/or a cloud-based service), such as storage 118.

Classifiers 120, described in further detail below, may be implemented in a server or other computing system. Of the classifiers, a subject classifier may identify a target subject of the plurality of subjects based on the CSI dataset via a subject machine learning (ML) model. Further, an activity classifier may identify an activity exhibited by the target subject based on the CSI dataset via an activity ML model trained on a training dataset.

A key challenge addressed by example embodiments is that, by defining as n and m respectively the number of subjects and activities, the number of classes to distinguish becomes nm. For example, 3 subjects and 10 activities correspond to more than 59,000 classes. To address this challenge, example embodiments may utilize multiple Wi-Fi devices as CSI collectors, wherein the receiver device closest to a given subject may classify the activities conducted by that subject. The device closest to the subject (e.g., device 110*a* and subject 102*a*) will dominantly characterize the channel property between itself and the source of the Wi-Fi signal (e.g., transmitter 105). Finding the closest device to a given subject falls under the Wi-Fi indoor localization and/or fingerprinting problem, which is understood in the art. Although assigning a device to a subject addresses the scalability issue (i.e., the classifier output becomes m-sized), the overall performance may significantly degrade with new untrained environments and subjects. Thus, example embodiments may incorporate a Few-Shot Learning (FSL) architecture as described below, which can adapt to any new environment, change in environment or any new subject with up to 15 seconds of new data for each class.

In contrast to existing approaches, example embodiments can distinctly classify among different human subjects performing multiple activities simultaneously by utilizing multiple CSI collectors, each associated to a given subject. To address the challenge of generalizing to new environments and subjects, example embodiments can incorporate a FSL-based architecture called Feature Reusable Embedding Learning (FREL) In contrast to existing approaches, FREL can adapt to any new environment and subject through two main steps, namely metalearning and fine-tuning. Moreover, in contrast to the traditional FSL, FREL combines both the embedding learning and metalearning approaches to achieve better performance through finetuning the classifier with only a few additional samples.

Figure 2:
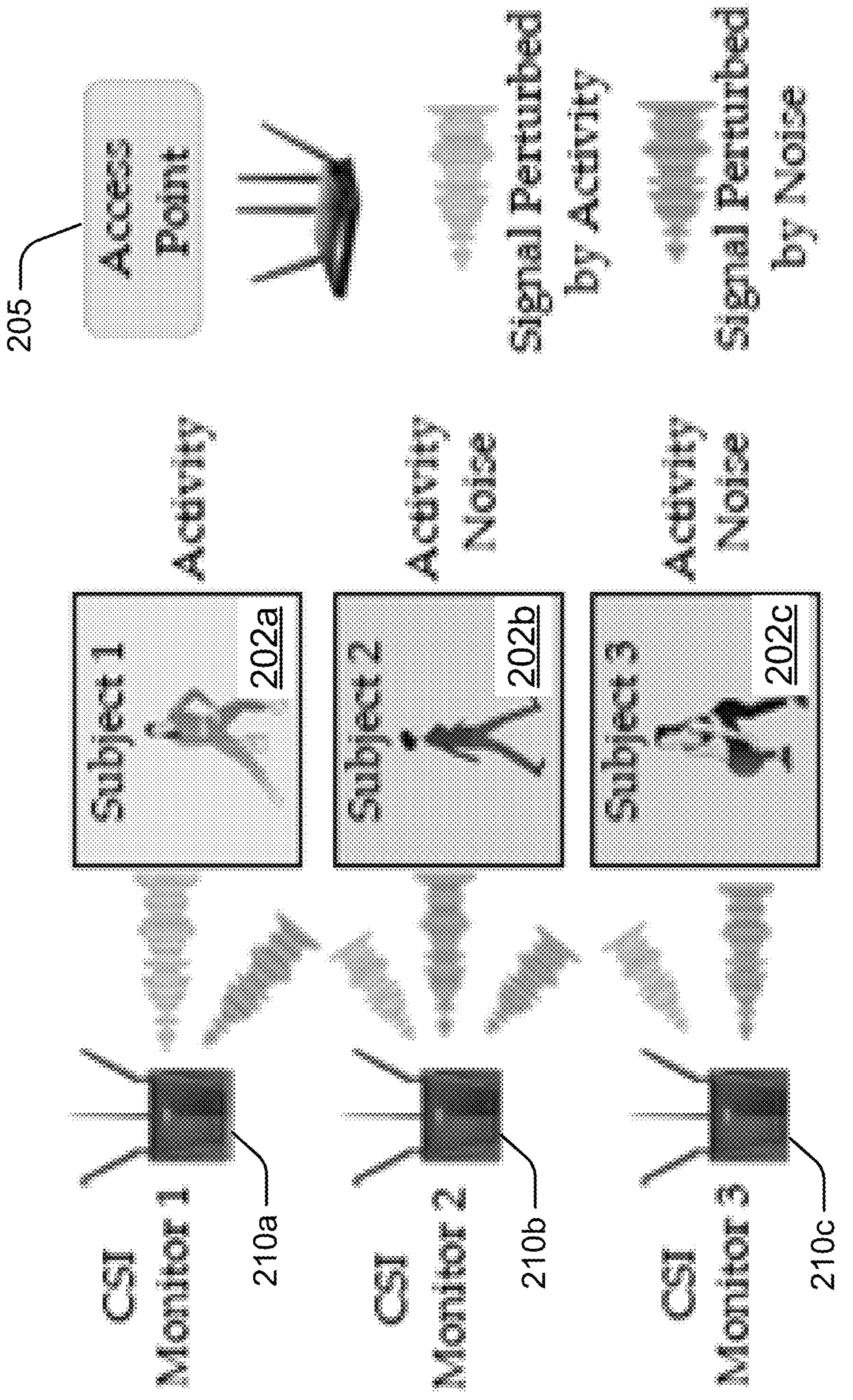
FIG. 2 is a diagram of a system configured for a proximity test in one embodiment.

FIG. 2 is a diagram of a proximity test system 200 configured for operating a proximity test in one embodiment. The system 200 may include a plurality of wireless CSI monitors (receivers or stations) 210*a-c*, each proximate to a respective subject 202*a-c*, and a wireless access point (transmitter) 205. Wi-Fi sensing in example embodiments can leverage small changes in the CSI computed through pilot symbols included in the physical layer (PHY) preamble. Although the CSI may be captured by monitoring a transmission link between the access point 205 and the monitors 210*a-c* without any direct communication with the access point, a monitoring device captures the CSI of the propagation channel between itself and the access point. Thus, when the CSI monitors are spatially distant enough, they would monitor the independent propagation path between the corresponding antenna pair of the access point and itself. Our key intuition is that the captured CSI is dominantly characterized by any physical change in the environment at spatially closer proximity. To evaluate this, the test system 200 can be operated to perform tests that demonstrate the viability of example embodiments. Such example embodiments have performed the sensing proximity test in 3 different environments with 3 different subjects and 20 activities. A monitor 210*a-c* may be assigned to each of the subjects 202*a-c*. The monitors 210*a-c* may be placed at a distance of 1.5 m-3.0 m from each other, whereas one human subject 202*a-c* performs activity at a distance of 1.5 m-2.0 m from each of the sensing monitors for each of the environments. From each environment, CSI may be collected in three separate rounds where in every round one of the subjects 202*a-c* performs 20 different activities while other subjects perform random activities.

Figure 3:
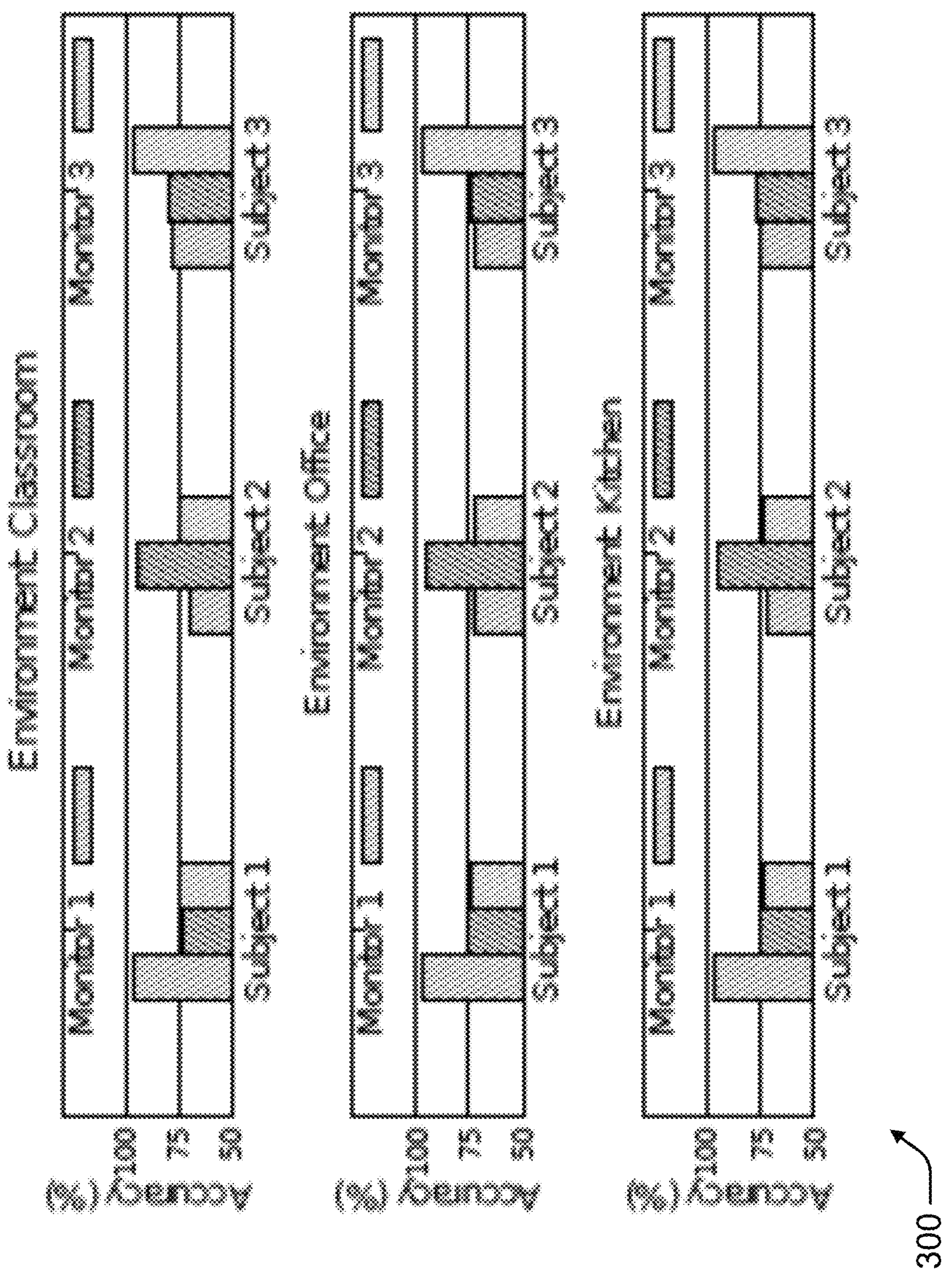
FIG. 3 is a chart of example results of a proximity test in one embodiment.

FIG. 3 is a chart of example results of a proximity test in one embodiment. For example, in the classroom environment, the accuracy of Subject 1 is 95% from the CSI data of Monitor 1 whereas, with the exact same setup and tests, the accuracy of Subject 2 and Subject 3 decreases by 30% on an average with Monitor 1. This result is due to the monitors being comparatively farther away from Subject 1 and more prone to the noises created by the other subjects at that instant. However, their performances improve drastically to 96% and 97% when considering CSI Monitor 2 and CSI Monitor 3 for Subject 2 and Subject 3 respectively. The other two environments follow similar trends. This clearly demonstrates that the CSI monitor closest to the subject performs better than other CSI monitors.

Figure 4:
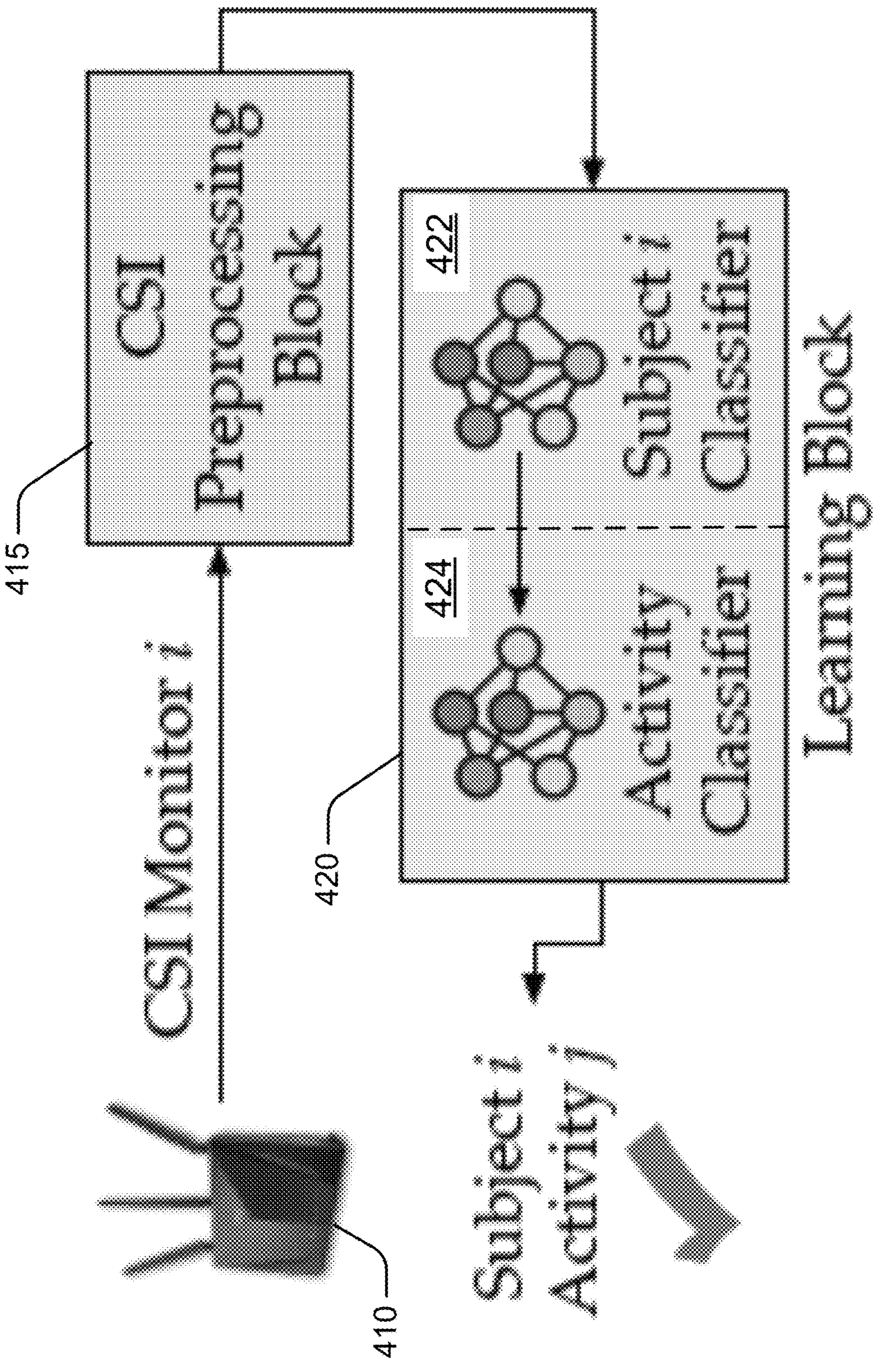
FIG. 4 is a diagram of classification processing blocks in one embodiment.

FIG. 4 is a diagram of classification processing blocks in one embodiment, which may be implemented by the system 100 described above. The processing may be divided into three main task blocks: a sensing block 140, a preprocessing block 415, and a learning block 420, which includes a subject classifier 422 and an activity classifier 424. The sensing block 410 may collect the CSI of Wi-Fi transmissions. Modern Wi-Fi systems are based on the Orthogonal Frequency Division Multiplexing (OFDM) modulation, which processes multiple data streams in parallel over multiple orthogonal subcarriers. Each spatially diverse CSI monitor captures S samples during the time interval T=t' t0 with K orthogonal parallel subcarriers. Thus, the extracted CSI matrix of an M×N system is shown in Equation 1:

$$H_r^{m,n} = \begin{bmatrix} h_{1,1}^{m,n} & \dots & h_{1,s}^{m,n} & \dots & h_{1,K}^{m,n} \\ \vdots & & \vdots & & \vdots \\ h_{s,1}^{m,n} & \dots & h_{s,s}^{m,n} & \dots & h_{s,K}^{m,n} \\ \vdots & \ddots & \vdots & \ddots & \vdots \\ h_{S,1}^{m,n} & \dots & h_{S,k}^{m,n} & \dots & h_{S,K}^{m,n} \end{bmatrix} \quad (1)$$

Here, $$H_r^{m,n}$$

denotes the CSI matrix at receiver r of the transmit antenna m and receive antenna n where 1≤n≤N and 1≤m≤M. The value $$H_{k,s}^{m,n}$$

denotes the CSI of the S-th sample at K-th subcarrier from transmit antenna m to the receive antenna n. For example, during the time interval T=0:2 s, if any CSI monitor captures S=600 samples with a channel of 80 MHz bandwidth, $$H_r^{m,n}$$

will have S×K components where K=242. Even though the total number of subcarriers in 80 MHz channel is 256, only data-transmitting subcarriers may be considered, discarding the null and the guard ones.

Figure 5:
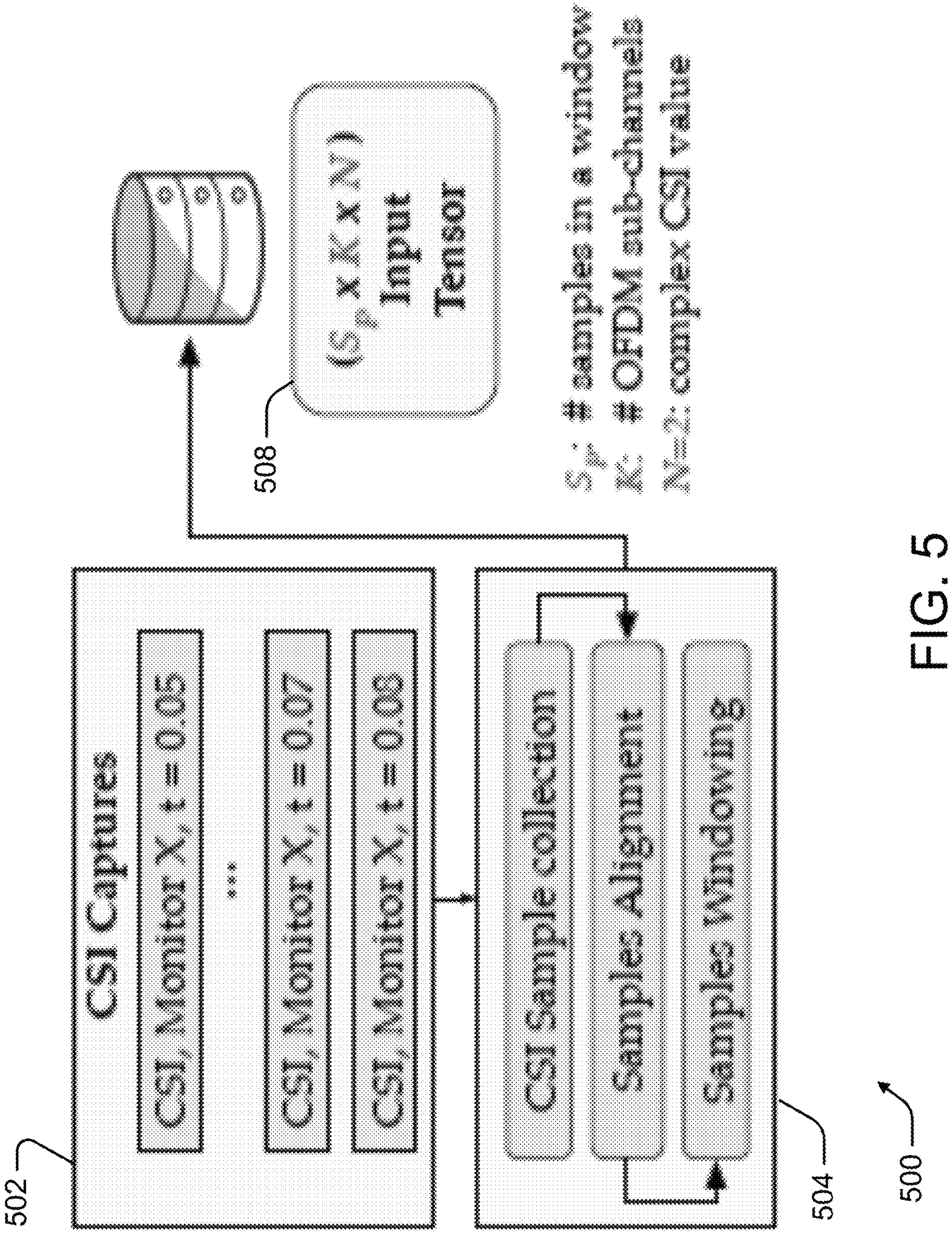
FIG. 5 is a flow diagram of preprocessing of CSI samples in one embodiment.

FIG. 5 is a flow diagram of a process 500 of preprocessing CSI samples in one embodiment. After the collection of the CSI samples (502), the captured data may be preprocessed before it is fed to the learning block. After S samples are collected, the data may be aligned by discarding the missing and/or corrupted CSI measurements (504). Moreover, any abrupt amplification in the data may be removed by normalizing with the mean CSI amplitude. Then, the captures are segmented with a fixed size non-overlapping window along the time domain (508). If the total number of samples captured during any time interval T is S, such that T=T1+T2+T3+ . . . + Tn where T is divided into n equal time windows, S=S1+S2+S3+ . . . + Sn are the corresponding sample captures of the n time segments. Thus, each window has the tensor dimension of $S_p$×K×N where $S_p$ is the number of samples in p-th time window $T_p$, and N=2 is the complex CSI measurement. This processed data is then fed to the input of the learning block.

One of the challenges in multi-subject detection is scalability. For P persons and Q activities, there are $Q^P$ possible combinations, resulting in an exponential increase in the number of classes. One centralized model to classify multi-subject activities becomes difficult when P and Q are large. To tackle this problem, example embodiments can implement a decentralized detection system for each subject. Specifically, a learning model may be assigned to each device to sense the subject which is closest to it. Therefore, each subject only requires Q detection regions in hyperspace. For P subjects, the overall complexity reduces to P×Q. This approach may have optimal success when there are at least the same number of CSI collectors as subjects. Such a scenario is common given the ubiquity of smart devices, such as laptops or smartphones, and the close proximity that people have to those devices. Further, the subject closest to the device take the most significant part in shaping the channel property between the device and AP.

Figure 6:
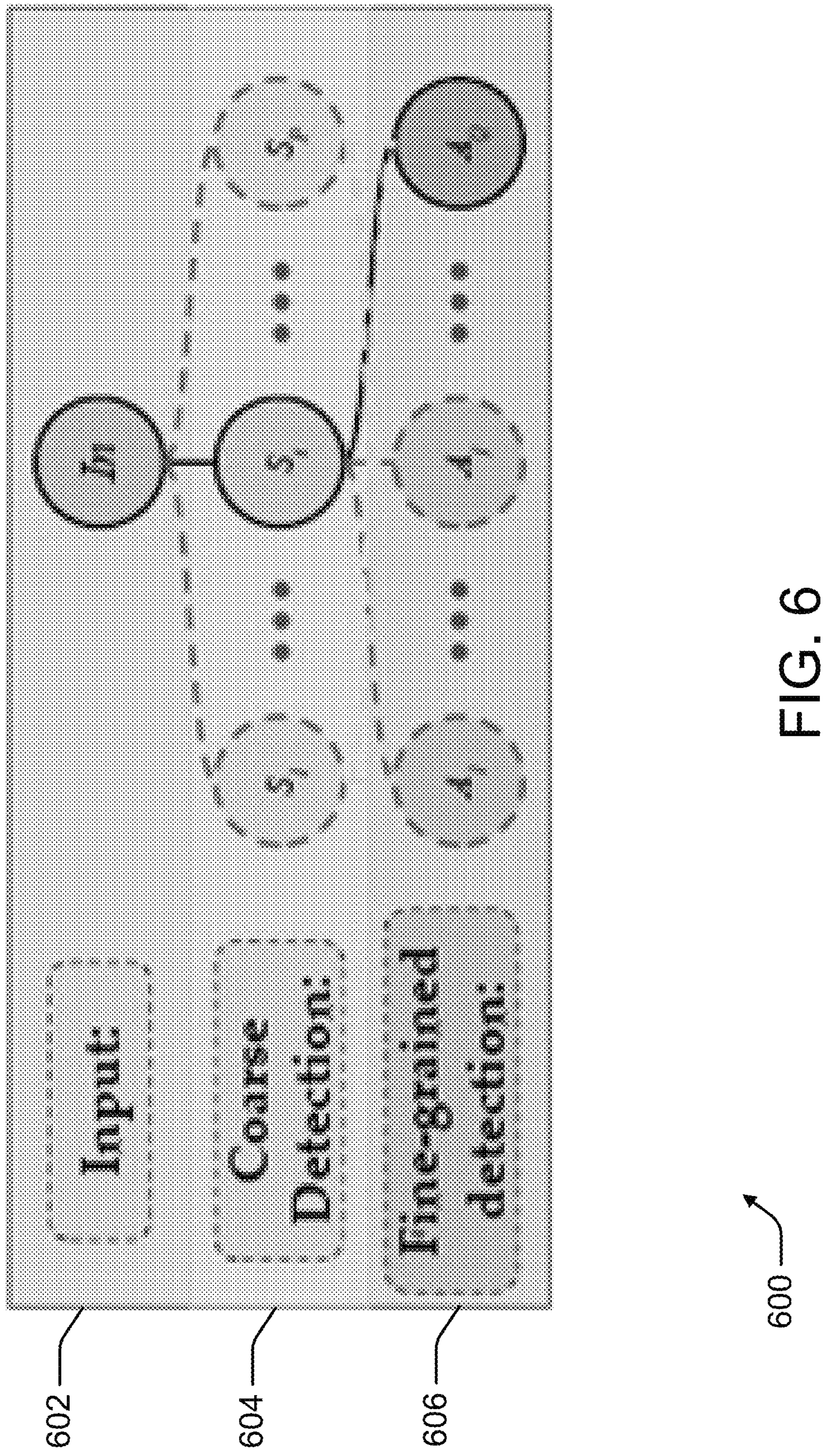
FIG. 6 is a diagram of a cascaded model in one embodiment.

FIG. 6 is a diagram of a cascaded model 600 in one embodiment. To further decrease complexity, the cascaded model 600 can provide for two-stage detection. In the first stage 604 receiving the input 602, a deep learning (DL)

model may be used to discriminate different subjects S coarsely. After the coarse detection stage, a second stage 606 implements a fine-grained DL model to determine the activities A. Regardless of the output at the first stage, all the subjects will share the same fine-grained model at the second stage. Thus, the overall complexity becomes P+Q.

One challenging problem of the hierarchical detection model is that, even if different persons do the same activities, their movements will have personal patterns and gestures. Furthermore, subjects may join or leave the detection system. Thus, it may be impractical to have a universal classifier for activity detection. In addition, the performance of data-driven algorithms in wireless sensing usually will be downgraded by time-varying channel conditions. Thus, example embodiments benefit from a model that can swiftly adapt to new subjects and channel features.

Figure 7:
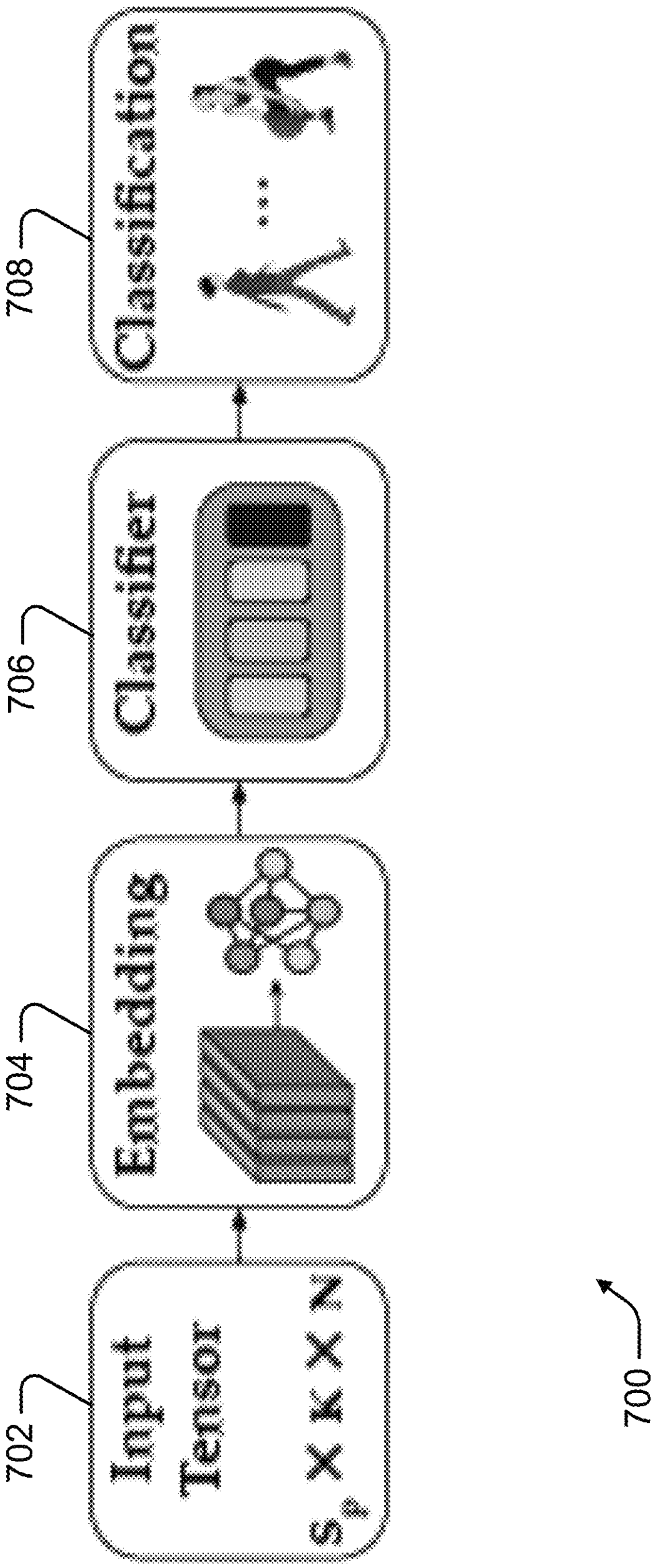
FIG. 7 is a flow diagram of a Feature Reusable Embedding Learning (FREL) process in one embodiment.

FIG. 7 is a diagram of a Feature Reusable Embedding Learning (FREL) process 700 in one embodiment. The process 700 enables the DL model described above to adapt to new scenarios with relatively few data. Example embodiments may utilize this algorithm in both subject detection and activity detection stages.

FSL aims at training models that can rapidly generalize to new tasks with only a limited number of labeled samples, and is a strong candidate to address the data collection problem. One approach to FSL is to learn an embedding for multiple tasks. Specifically, a deep neural network (DNN) is used to learn a clustered mapping from input to the latent space. During the inference time, the embedding network does not need to be fine-tuned, and a few samples will be used as references to classify unobserved data. Another approach is meta-learning, which involves two phases: (i) metatraining and (ii) fine-tuning. Meta-learning aims to learn shared features between different tasks during the meta-learning phase and quickly optimize the parameters with a few data points during the fine-tuning stage.

The FREL process 700 combines embedding learning and meta-learning to provide a classification result 708. First, a DNN model is used to learn the embedding of the input 702, and another classifier is used to decode the features in the latent space. Similar to meta-learning, the FREL consists of meta-learning and fine-tuning stages. The embedding network 704 and classifier (706) may be trained jointly with a mini-dataset during the meta-learning phase, which is the same as embedding learning. After obtaining the embedding, the classifier 706 may be further optimized with a few samples while testing. In contrast to embedding learning, fine-tuning can provide better flexibility and granularity, which is more suitable for a dynamic system. Different from meta-learning, only the simple classifier can be retrained instead of the whole structure, which can reduce the computation, enabling a faster adaption to new tasks. The effectiveness of meta-learning may be largely due to feature reuse. It operates to fine-tune the last few layers, which can achieve comparable performance as the original algorithm.

Formally, the embedding network 704 can be considered as a function $E_\theta$:X→Z, where Z denotes the latent vector. The classifier $C_\Phi$Z→Y is to find a mapping between encoded features Z and labels Y. θ and Φ are the trainable parameters of the embedding network 704 and classifier 706, respectively. Hence, The overall system $F_\Psi(X)=Y$ can be written as $C_\Phi(E_\theta(X))=Y$, where Ψ={θ, Φ} is the total trainable parameters of the whole system. In FREL, models may be trained on a set of minibatches of data that only have N different classes (ways) and K samples (shots) of each class. Each batch of few-shot data can be considered as a new task in metalearning:

$$\tau_j = \{(x_i^j, y_i^j)\}|_{i=1}^m$$

Here, m=N×K denotes the total number of samples in one batch. An objective of meta-learning is to find a set of parameters that minimize the expectation of the loss function L with respect to a group of meta-learning tasks:

$$\mathcal{T} = \{\tau_j\}|_{j=1}^n \tag{2}$$

$$\min_{\{\theta,\phi\}} \frac{1}{n}\sum_{j=1}^{n}\left[\frac{1}{m}\sum_{i=1}^{m}\mathcal{L}\left(C_\phi\left(E_\theta\left(x_i^j\right)\right) = y_i^j\right)\right]$$

The task set T may be merged into a single dataset $D^{train}$ to achieve an improved embedding, which is given by:

$$\begin{aligned}\mathbb{D}^{train} &= \tau_1 \cup \ldots \cup \tau_j \cup \ldots \cup \tau_n \\ &= \{(x_i^1, y_i^1)\}|_{i=1}^m \bigcup \ldots \cup \{(x_i^n, y_i^n)\}|_{i=1}^m\end{aligned} \tag{3}$$

By merging multiple tasks into single dataset, the optimization problem in Equation 2 can be reduced to a general DL problem, which can be solved by a gradient decent optimizer iteratively:

$$\{\theta, \phi\} = \{\theta, \phi\} - \alpha\frac{1}{mn}\sum_{i=1}^{mn}\nabla_{\{\theta,\phi\}}\mathcal{L}(C_\phi(E_\theta(x_i)), y_i) \tag{4}$$

Here, mn is the total number of data points in $D^{train}$ and is the learning rate. Once the optimal embedding θ* is obtained, the classifier is fine-tuned on another small portion of data $D^{tune}$. Unlike training on a combined set during the metalearning, each iteration can randomly sample K shots from each of N ways in Dtune to build a new task and update classifier by gradient descent:

$$\phi = \phi - \beta\frac{1}{m}\sum_{i=1}^{m}\nabla_\phi\mathcal{L}(C_\phi(E_{\theta^*}(x_i)), y_i) \tag{5}$$

Here, B denotes the learning rate in the fine-tuning phase. Performance may then be evaluated on the rest of unseen dataset $D^{test}$.

Algorithm 1, provided below, summarizes an example FREL process. Although embodiments described herein implement FREL for WiFi sensing, the architecture is presented here generally in a manner that can be used for other FSL purposes.

Algorithm 1: Feature Reusable Embedding Learning

```
Phase 1: FREL meta-learning
Require: learning rate α, dataset 𝔻^train
Initialize: θ for embedding, ϕ for classifier
for iteration = 1,2, ... do
  update θ and ϕ with 𝔻^train by Equation 4
end
Return: θ* for embedding
Phase 2: FREL fine-tuning
Require: learning rate β, dataset 𝔻^tune
Initialize: ϕ for classifier
```

-continued

Algorithm 1: Feature Reusable Embedding Learning

```
for epoch = 1,2, ... do
    for episode = 1,2, ... do
        sample a task τ = {(x_i, y_i)|_{i=1}^m} from 𝔻^tune
        update ϕ with τ by Equation 5
    end
end
Return: ϕ* for classifier
```

Figure 8:
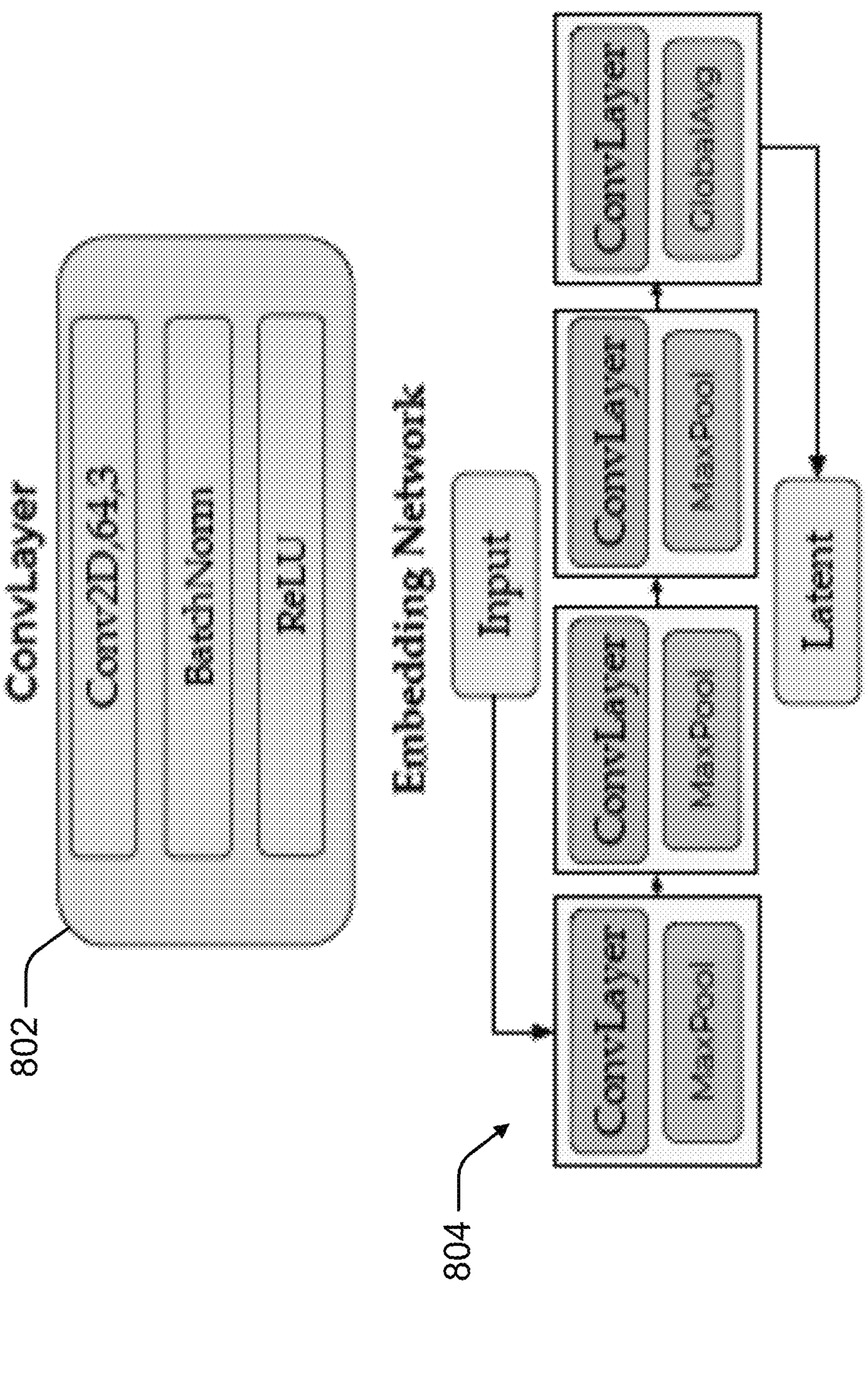
FIG. 8 is a diagram of a deep neural network (DNN) architecture for use in a FREL process in one embodiment.

FIG. 8 is a diagram of a deep neural network (DNN) architecture 800 for use in a FREL process in one embodiment. It is composed of 4 convolutional layers 804 followed by batch normalization and Rectified Linear Unit (ReLU) activation 802. Each convolutional layer 804 may comprise 64 channels with a kernel size of 3×3. After the first three convolutional layers, 2×2 Max pooling layers are used to down sample the previous layer's output. After the fourth convolutional layer, a global average pooling strategy is chosen to extract the feature to the latent space, resulting in a 64-dimensional feature space.

Classifier: A fully-connected layer is used on top of the pre-trained embedding network as a linear decoder. To investigate the effectiveness of fine-tuning in FREL, example embodiments may implement an untrainable K-Nearest Neighbor (K-NN) algorithm as a comparison after the meta-learning phase following the same procedure as another state-of-the-art FSEL model. During the inference time of K-NN, K samples from each class are transformed into embedding as supports, and the queries are classified by a plurality vote of the K nearest supports.

Mini-dataset: Usually in general FSL, the dataset such as Omniglot and Mini-ImageNet contains a large number of tasks and a few number of samples in each task. Algorithms are first pre-trained on multiple tasks and then fine-tuned and tested on single specific task. However, it is never feasible to get a dataset with comprehensive tasks in wireless sensing since the changing environment can always generate new tasks that models have never seen before. Thus, one significant difference in this implementation is the mini-dataset. For example, a limited number of data collected in 15 seconds for $D^{tune}$ may be utilized. The test set $D^{test}$ may remain unexposed to the model during pretraining and fine-tuning. The mini-dataset makes the problem more challenging as models are learned from not only a few samples but a few tasks.

Learning strategy: The model may be evaluated with 5-shot learning, which means there are 5 samples for each class in every mini-batch data. Adam may be chosen, in one example, as the optimizer in both phases. The learning rate and are 0.01. Cross-entropy loss is used during the pre-training and fine-tuning stages for simplicity. Other metrics such as deep k-means and prototypical loss can be applied for different purpose.

Figure 9:
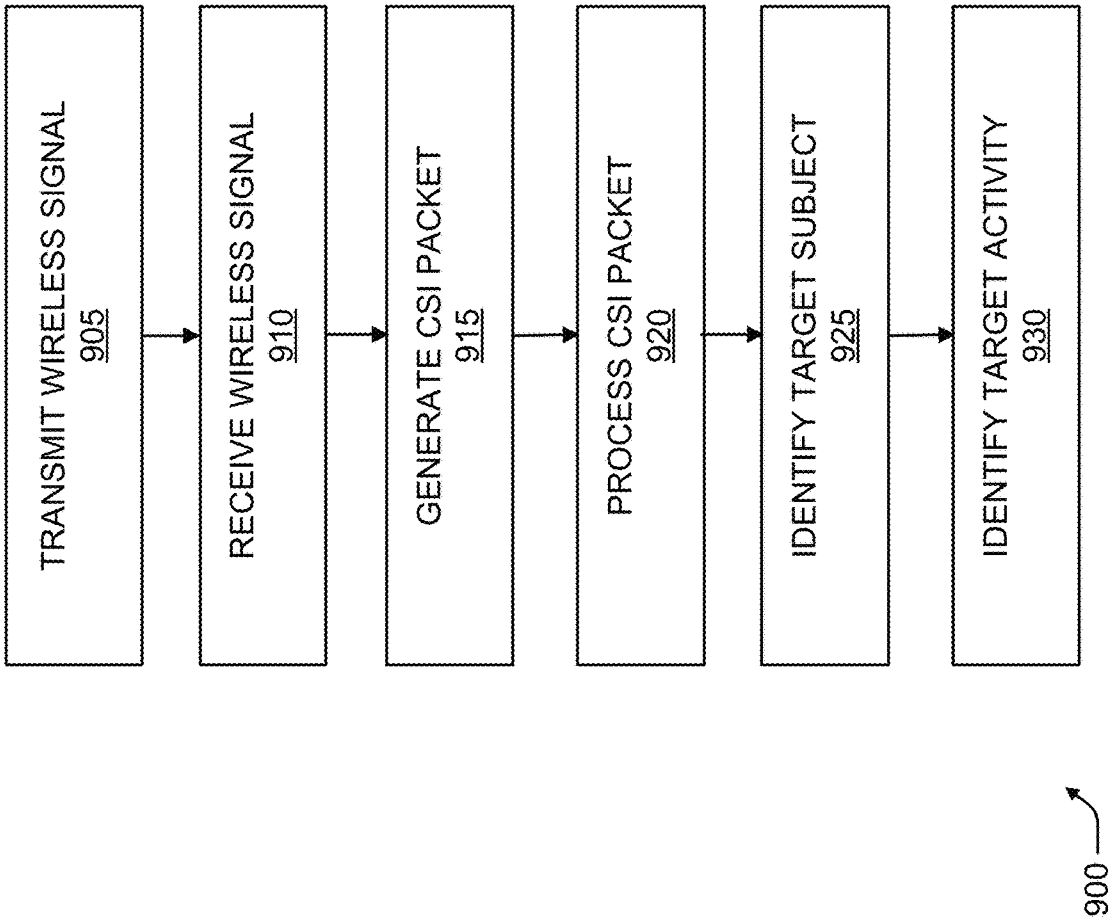
FIG. 9 is a flow diagram of a process of sensing an environment in one embodiment.

FIG. 9 is a flow diagram of a process 900 of sensing an environment, which may be implemented by the system 100 and incorporating some or all of the features described above with reference to FIGS. 1-8. A wireless signal may be transmitted through the environment (905). Via a plurality of wireless receivers, the wireless signal may be received at the distinct location within the environment via at least one respective antenna (910). Via the plurality of wireless receivers, a channel state information (CSI) packet indicating a state of a wireless communications channel associated with the wireless signal may be generated (915). The CSI packets from the plurality of wireless receivers may be processed to generate a CSI dataset as a function of the CSI packets (920). A target subject of the plurality of subjects may be identified based on the CSI dataset via a subject machine learning (ML) model trained on a first training dataset (920). An activity exhibited by the target subject may then be identified based on the CSI dataset via an activity ML model trained on a second training dataset (930).

While example embodiments have been particularly shown and described, it will be understood by those skilled in the art that various changes in form and details may be made therein without departing from the scope of the embodiments encompassed by the appended claims.

What is claimed is:

1. A system for sensing an environment, comprising:

a wireless transmitter device configured to transmit a wireless signal through the environment;

a plurality of wireless receivers each positioned at a distinct location within the environment, each of the plurality of wireless receivers being located closest to a respective subject of a plurality of subjects and configured to:

receive the wireless signal at the distinct location within the environment via at least one respective antenna, and generate a channel state information (CSI) packet indicating a state of a wireless communications channel associated with the wireless signal;

a computing device configured to process the CSI packets from the plurality of wireless receivers to generate a CSI dataset as a function of the CSI packets;

a subject classifier configured to identify a target subject of the plurality of subjects based on the CSI dataset via a subject machine learning (ML) model; and an activity classifier configured to identify an activity exhibited by the target subject based on the CSI dataset via an activity ML model trained on a training dataset.

2. The system of claim 1, wherein the computing device is further configured to generate the CSI dataset as a function of a subset of the CSI packets generated at distinct points during a given time interval.

3. The system of claim 1, wherein the subject ML model is one of a plurality of subject ML models each assigned to a respective one of the wireless receivers.

4. The system of claim 3, wherein the subject classifier is further configured to update each of the plurality of subject ML models based on a subset of the CSI dataset associated with the respective one of the wireless receivers.

5. The system of claim 1, further comprising an embedding network configured to map an input tensor to a latent vector, the input tensor corresponding to a subset of the CSI dataset.

6. The system of claim 5, wherein the activity classifier is configured to identify the activity by mapping the latent vector to a label via the activity ML model.

7. The system of claim 5, wherein the embedding network and activity classifier are trained jointly via the training dataset.

8. The system of claim 6, wherein the training dataset is a first training dataset, and wherein the activity classifier is further trained via a second training dataset distinct from the first training dataset.

9. The system of claim 1, wherein the wireless transmitter includes a plurality of antennas through which the wireless signal is transmitted through the environment.

10. The system of claim 1, wherein the activity classifier is trained via the training dataset and a few-shot learning (FSL) process.

11. The system of claim 1, wherein the activity classifier is further configured to determine the activity based on at least one previous activity that was determined for a prior CSI dataset obtained at an earlier point in time.

12. The system of claim 1, wherein the activity includes movement of the target subject within the environment.

13. A method of operating a classification engine, comprising:

during a meta-learning phase, training an embedding network and a classifier jointly;

during an optimization phase, training the classifier independent from the embedding network via a training dataset; and during an operational phase:

via the embedding network, mapping an input tensor to a latent vector, the input tensor corresponding to an input dataset; and via the classifier, identifying a classification corresponding to the input tensor by mapping the latent vector to a label.

14. A method of sensing an environment, comprising:

transmitting a wireless signal through the environment;

receiving, via a plurality of wireless receivers, the wireless signal at a distinct location within the environment via at least one respective antenna, each of the wireless receivers positioned at the distinct location within the environment, each of the plurality of wireless receivers being located closest to a respective subject of a plurality of subjects;

generating, via the plurality of wireless receivers, a channel state information (CSI) packet indicating a state of a wireless communications channel associated with the wireless signal;

processing the CSI packets from the plurality of wireless receivers to generate a CSI dataset as a function of the CSI packets;

identifying a target subject of the plurality of subjects based on the CSI dataset via a subject machine learning (ML) model trained on a first training dataset; and identifying an activity exhibited by the target subject based on the CSI dataset via an activity ML model trained on a second training dataset.

15. The method of claim 14, further comprising generating the CSI dataset as a function of a subset of the CSI packets generated at distinct points during a given time interval.

16. The method of claim 14, wherein the subject ML model is one of a plurality of subject ML models each assigned to a respective one of the wireless receivers.

17. The method of claim 16, further comprising updating each of the plurality of subject ML models based on a subset of the CSI dataset associated with the respective one of the wireless receivers.

18. The method of claim 14, further comprising mapping an input tensor to a latent vector, the input tensor corresponding to a subset of the CSI dataset.

19. The method of claim 18, further comprising identifying the activity by mapping the latent vector to a label via the activity ML model.

20. The method of claim 13, further comprising jointly training the embedding network and the classifier via the training dataset.

21. The method of claim 20, wherein the training dataset is a first training dataset, and further comprising training the classifier via a second training dataset distinct from the first training dataset.

* * * * *